United States Patent
Ookita et al.

(10) Patent No.: US 6,892,869 B2
(45) Date of Patent: May 17, 2005

(54) MULTI-PLATE FRICTION CLUTCH

(75) Inventors: Masato Ookita, Shizuoka (JP); Makoto Amano, Shizuoka (JP); Kenji Toda, Shizuoka (JP); Kimikazu Ootsuki, Wako (JP); Hiroki Kawana, Wako (JP); Tarou Takashima, Wako (JP)

(73) Assignees: Kabushiki Kaisha F.C.C., Shizuoka (JP); Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 10/690,815

(22) Filed: Oct. 23, 2003

(65) Prior Publication Data

US 2004/0144614 A1 Jul. 29, 2004

(30) Foreign Application Priority Data

Oct. 24, 2002 (JP) ........................................ 2002-309678

(51) Int. Cl.[7] .......................................... F16D 25/0638
(52) U.S. Cl. .............................. 192/85 AA; 192/109 A; 192/109 F
(58) Field of Search ........................ 192/85 AA, 109 A, 192/109 F (56) References Cited

U.S. PATENT DOCUMENTS

| | | | | |
|---|---|---|---|---|
| 3,285,379 A | * | 11/1966 | Helquist | ................ 192/85 AA |
| 4,541,515 A | * | 9/1985 | Nishimura et al. | ..... 192/85 AA |
| 4,934,502 A | * | 6/1990 | Horsch | ................... 192/85 AA |
| 5,090,539 A | * | 2/1992 | Wolf et al. | ............. 192/85 AA |

FOREIGN PATENT DOCUMENTS

JP        4-341652 A        11/1992

* cited by examiner

Primary Examiner—Richard M. Lorence
(74) Attorney, Agent, or Firm—Westerman, Hattori, Daniels & Adrian, LLP

(57) ABSTRACT

A multi-plate friction clutch includes: a clutch piston 10 which is fitted to a clutch outer and capable of being hydraulically operated to press a group of first and second friction plates toward a pressure-receiving plate; an annular retaining groove formed in a pressing surface of the clutch piston; and a buffering Belleville spring accommodated in the retaining groove and capable of abutting resiliently against the group of the first and second friction plates. The retaining groove has an annular projection formed at its axial opening edge for inhibiting the disengagement of the Belleville spring from the retaining groove. Thus, even when the number of the friction plates is increased, a total gap between the clutch piston and the pressure-receiving plate can be set freely without giving consideration to the falling-off of the Belleville spring.

2 Claims, 7 Drawing Sheets

MULTI-PLATE FRICTION CLUTCH

BACKGROUND OF THE INVENTION

1. Field of the Invention

The present invention relates to an improvement in a multi-plate friction clutch comprising: a clutch outer; a clutch inner surrounded by the clutch outer; a plurality of first friction plates which are axially slidably spline-coupled to the clutch outer; a plurality of second friction plates which are superposed alternately with the first friction plates and axially slidably spline-coupled to the clutch inner; a pressure-receiving plate fixed to the clutch outer to be opposed to one side of a group of the first and second friction plates; and a clutch piston which is fitted to the clutch outer and which is capable of being hydraulically operated to press the group of the first and second friction plates toward the pressure-receiving plate, the clutch piston having a pressing surface adapted to press the group of the first and second friction plates and an annular retaining groove formed in the pressing surface, and a buffering Belleville spring being accommodated in the retaining groove and capable of resiliently abutting against the group of the first and second friction plates.

2. Description of the Related Art

A conventional multi-plate friction clutch is already known, as disclosed in Japanese Patent Application Laid-open No. 4-341652.

In the conventional multi-plate friction clutch, an inner peripheral surface of the retaining groove in the clutch piston is formed into a cylindrical surface coaxial with the clutch piston in order to facilitate the insertion of the Belleville piston into the retaining groove.

In the conventional multi-plate friction clutch, a total gap between the clutch piston and the pressure-receiving plate is set to prevent the falling-off of the Belleville spring from the retaining groove.

However, a gap between the adjacent friction plates cannot be narrowed to a given value or less in order to avoid the dragging of the clutch in a transmission cut-off state. Therefore, when the number of the friction plates is increased to increase the torque capacity of the clutch, it may be difficult in some cases to suppress the total gap between the clutch piston and the pressure-receiving plate to a range which prevents the disengagement of the Belleville spring.

SUMMARY OF THE INVENTION

Accordingly, it is an object of the present invention to provide a multi-plate friction clutch in which, even when the number of friction plates is increased, a total gap between a clutch piston and a pressure-receiving plate can be set freely without giving consideration to the falling-off of the Belleville spring.

To achieve the above object, according to a first feature of the present invention, there is provided a multi-plate friction clutch comprising: a clutch outer; a clutch inner surrounded by the clutch outer; a plurality of first friction plates which are axially slidably spline-coupled to the clutch outer; a plurality of second friction plates which are superposed alternately with the first friction plates and axially slidably spline-coupled to the clutch inner; a pressure-receiving plate fixed to the clutch outer to be opposed to one side of a group of the first and second friction plates; and a clutch piston which is fitted to the clutch outer and which is capable of being hydraulically operated to press the group of the first and second friction plates toward the pressure-receiving plate, the clutch piston having a pressing surface adapted to press the group of the first and second friction plates and an annular retaining groove formed in the pressing surface, and a buffering Belleville spring being accommodated in the retaining groove and capable of resiliently abutting against the group of the first and second friction plates, wherein the retaining groove has an annular projection formed at its axial opening edge for inhibiting the disengagement of the Belleville spring from the retaining groove.

With the first feature, even in a transmission cut-off state of the clutch, the Belleville spring is inhibited from being disengaged from the retaining groove by the annular projection. Therefore, when the number of the first and second friction plates is increased to provide an increase in torque capacity of the clutch, there is no inconvenience even if the total gap between the clutch piston and the pressure-receiving plate is larger than the axial length of the Belleville spring. Therefore, it is possible to increase the number of the friction plates freely without giving consideration to the falling-off of the Belleville spring, to thereby easily provide an increase in torque capacity of the clutch.

According to a second feature of the present invention, in addition to the first feature, the Belleville spring is formed into an elliptic shape so that, when the Belleville spring is resiliently formed into a substantially perfect circle, it can be inserted into the retaining groove without being interfered by the annular projection.

With the second feature, although the retaining groove is provided with the annular projection for preventing the disengagement of the Belleville spring, the Belleville spring can be easily mounted in the retaining groove, and a posterior treatment for preventing the disengagement of the Belleville spring is not required after the mounting. Therefore, a good assemblability is achieved, and an increase in the number of processing steps can be suppressed, which can contribute to a reduction in cost.

The above and other objects, features and advantages of the invention will become apparent from the following description of the preferred embodiment taken in conjunction with the accompanying drawings.

DESCRIPTION OF THE PREFERRED EMBODIMENTS

The present invention will now be described by way of preferred embodiments with reference to the accompanying drawings.

Figure 1:
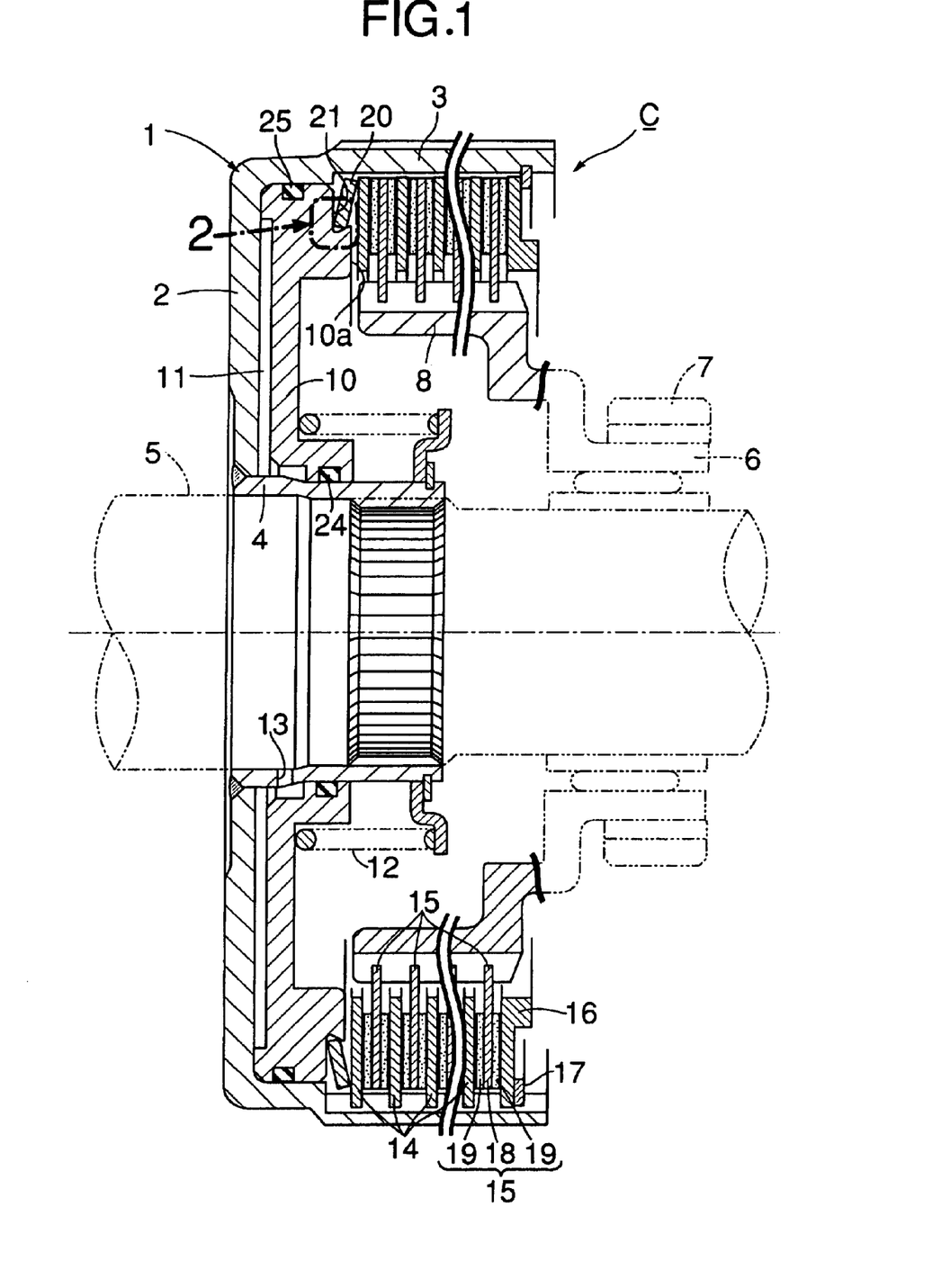
FIG. 1 is a vertical sectional view of a multi-plate friction clutch according to an embodiment of the present invention.

Referring first to FIG. 1, a reference symbol C designates a multi-plate friction clutch for an automatic transmission of an automobile. The clutch C includes a clutch outer 1 which is comprised of a cylindrical portion 3 connected to an outer peripheral end of an end wall 2, and a hub 4 connected to an inner peripheral end of the end wall 2 and spline-coupled to an input shaft 5. An output shaft 6 integrally provided with a driving gear 7 is relatively rotatably carried on the input shaft 5. An clutch inner 8 integrally connected to the output shaft 6 is disposed concentrically within the cylindrical portion 3.

A clutch piston 10 is slidably received on an inner peripheral surface of the cylindrical portion 3 and an outer peripheral surface of the hub 4, with a pair of seal members 24 and 25 interposed therebetween, to define a hydraulic pressure chamber 11 between the clutch piston 10 and the end wall 2. A return spring 12 for biasing the clutch piston 10 toward the hydraulic pressure chamber 11 is mounted under compression between the clutch piston 10 and the hub 4. A working oil supply/discharge bore 13 is provided in the hub 4, and leads to the hydraulic pressure chamber 11.

A plurality of first friction plates 14 are also slidably spline-coupled to the inner peripheral surface of the cylindrical portion 3 while being adjacent to an outer side of the clutch piston 10. A plurality of second friction plates 15 are spline-coupled to an outer peripheral surface of the clutch inner 8 and disposed so that they are superposed alternately with the first friction plates 14. Each of the first friction plates 14 is made of a steel plate, and each of the second friction plates 15 is formed by adhering friction linings 19 to opposite sides of a core plate 18 made of a steel plate.

A pressure-receiving plate 16 is spline-coupled to the cylindrical portion 3, and opposed to an outer side of the outermost second friction plate 15. The pressure-receiving plate 16 is inhibited from moving axially outwards by a retaining ring 17 secured to the cylindrical portion 3.

A buffering Belleville spring 20 is interposed between the clutch piston 10 and the first friction plate 14 adjoining the clutch piston 10.

Figure 2:
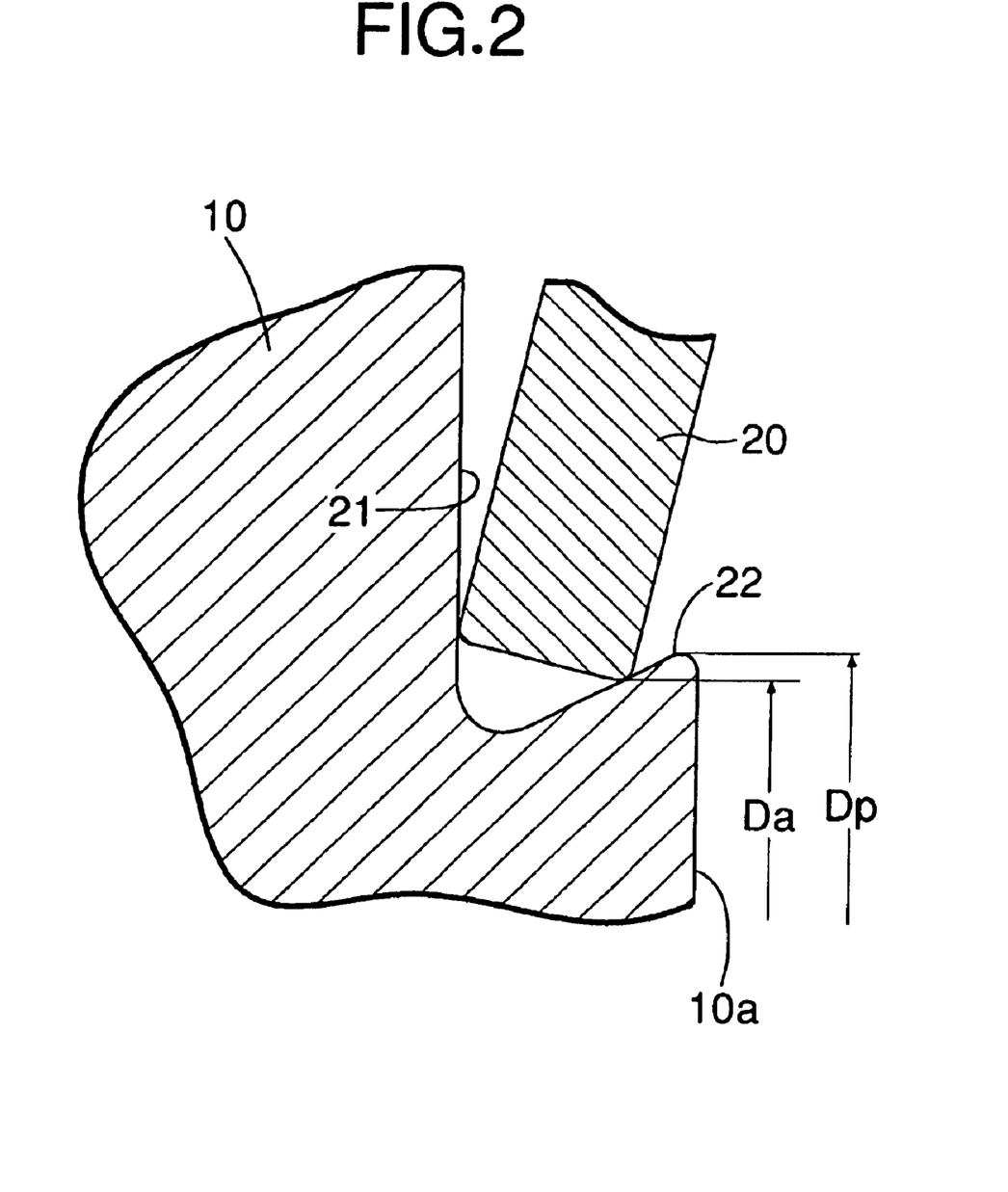
FIG. 2 is an enlarged view of a portion indicated by 2 in FIG. 1.
Figure 3:
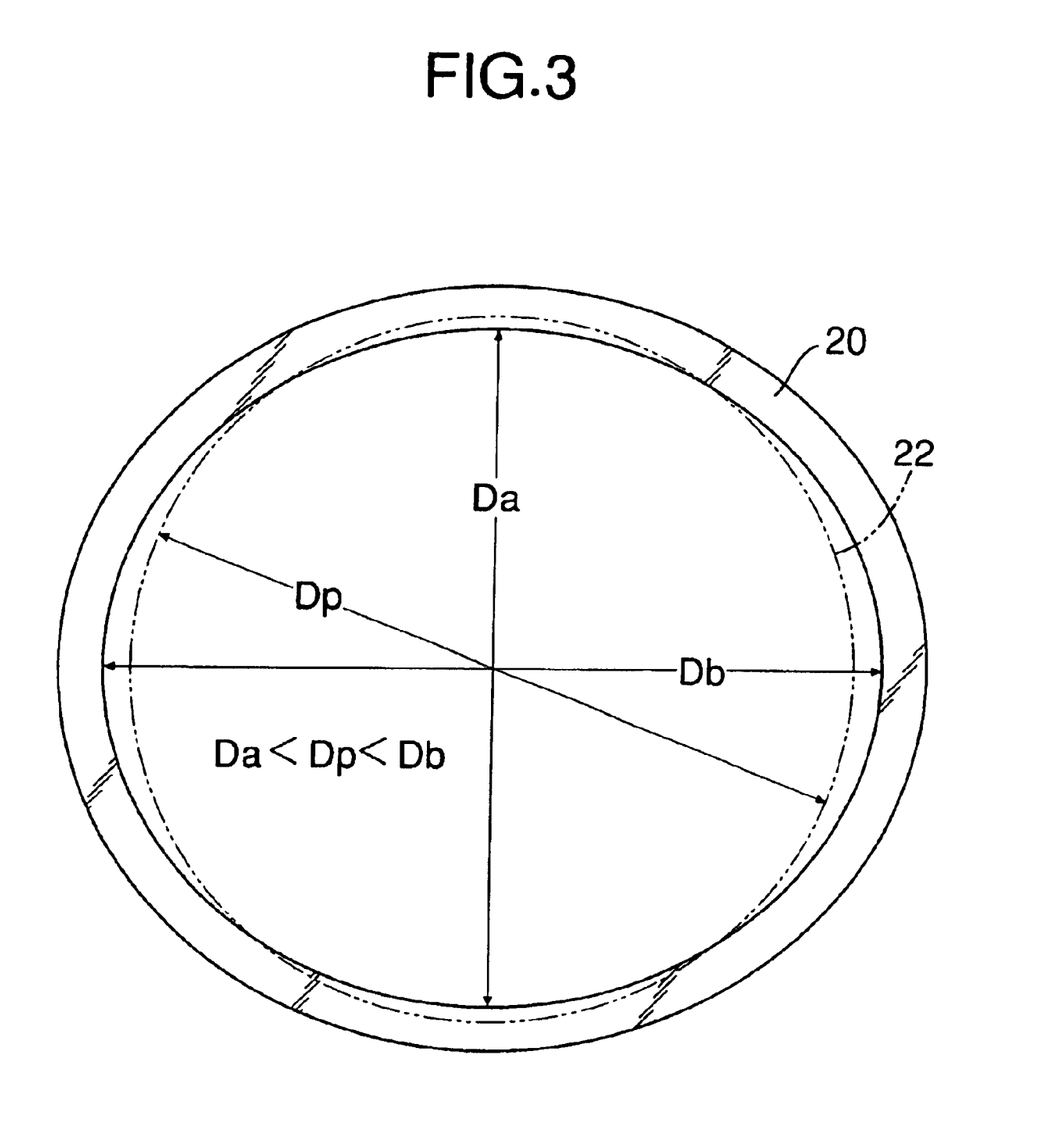
FIG. 3 is a plan view of a Belleville spring shown in FIGS. 1 and 2.

As shown in FIGS. 2 and 3, the Belleville spring 20 is of a truncated conical shape such that its diameter is increasing from the side of the clutch piston 10 toward the first friction plate 14. The Belleville spring 20 is disposed so that its inner peripheral end is accommodated in an annular retaining groove 21 formed in a pressing surface 10a of the clutch piston 10 opposed to the first friction plate 10, and its outer peripheral end protrudes from the pressing surface 10a to be opposed to the first friction plate 14 with a predetermined gap left therebetween. An annular projection 22 is formed at an axial opening edge of the retaining groove 21 to face radially outwards, so that the annular projection 22 is opposed to an outer side of the inner peripheral end of the Belleville spring 20. The disengagement of the Belleville spring 20 from the retaining groove 21 is inhibited by the annular projection 22. In the illustrated embodiment, the annular projection 22 is formed by cutting the inner side face of the retaining groove 21 into an inversed taper shape.

In order to facilitate the mounting of the Belleville spring 20 in the retaining groove 21 having the annular projection 22, the Belleville spring 20 has the following configuration:

The Belleville spring 20 is formed to assume an elliptic shape in its free state. In this case, when an inner shorter diameter of the Belleville spring 20 is represented by Da; an inner longer diameter of the Belleville spring 20 is represented by Db; and a diameter of the annular projection 22 is represented by Dp, the following inequality is satisfied:

$$Da < Dp < Db$$

and when the Belleville spring 20 is resiliently deformed into a substantially perfect circle, the inner diameter of the Belleville spring 20 becomes larger than the diameter Dp of the annular projection 22.

The operation of this embodiment will be described below.

If a working hydraulic pressure is supplied to the hydraulic pressure chamber 11 in the clutch C, the clutch piston 10 receiving the hydraulic pressure is advanced against a load of the return spring 12, to press the group of the first and second friction plates 14 and 15 to the pressure-receiving plate 16 through the Belleville spring 20. At this time, the gaps between the adjacent first and second friction plates 14 and 15 existing between the clutch piston 10 and the pressure-receiving plate 16 are eliminated, and the Belleville spring 20 is then compressed axially. As this compression load increases, a frictional force between the first and second friction plates 14 and 15 is increased, whereby the transmission of a power between the clutch outer 1 and the clutch inner 8, i.e., between the input shaft 5 and the output shaft 6 can be moderately started. When the Belleville spring 20 is pushed into the retaining groove 21, the pressing surface 10a of the clutch piston 10 directly presses the group of the first and second friction plates 14 and 15. Therefore, the frictional force between the first and second friction plates 14 and 15 is maximized to enable the transmission of a high torque between the input shaft 5 and the output shaft 6.

If the hydraulic pressure is released from the hydraulic pressure chamber 11, the clutch piston 10 is retracted by a resilient force of the return spring 12, to release the Belleville spring 20 and the first and second friction plates 14 and 15, so that the transmission of the power between the input shaft 5 and the output shaft 6 is cut off.

Even in such a transmission cut-off state of the clutch C, the Belleville spring 20 is inhibited from being released out of the retaining groove 21 by the annular projection 22 of the retaining groove 21. Therefore, when the numbers of the first and second friction plates 14 and 15 are increased to provide an increase in torque capacity of the clutch C, there is no inconvenience, even if the total gap between the clutch piston 10 and the pressure-receiving plate 16 accordingly becomes larger than the axial length of the Belleville spring 20. Therefore, it is possible to freely increase the numbers of the friction plates 14 and 15 without giving consideration to the falling-off of the Belleville spring 20, thereby easily providing an increase in torque capacity of the clutch C.

To mount the Belleville spring 20 in the retaining groove 21 of the clutch piston 10, a radially inward load is first applied to the elliptic Belleville spring 20, for example, on the side of its longer diameter to resiliently deform the Belleville spring 20 into the substantially perfect circle, thereby increasing the inner diameter of the Belleville spring 20 to be larger than the diameter Dp of the annular projection 22. Thereupon, if the annular projection 22 is passed through the Belleville spring 20 and the deforming load is then released from the Belleville spring 20, the Belleville spring 20 is restored to the original elliptic shape, whereby its inner shorter diameter Da becomes smaller than the diameter Dp of the annular projection 22. Therefore, the disengagement of the Belleville spring 20 from the retaining groove 21 is inhibited by the annular projection 22.

Another mounting process may be used as follows: one end of the Belleville spring 20 on the side of its shorter diameter is hitched in the retaining groove 21; the other end is then pulled, thereby deforming the Belleville spring 20 into a substantially perfect circle; and the other portion of the Belleville spring 20 can be accommodated in the retaining groove 21 without being obstructed by the annular projection 22.

Although the retaining groove 21 is provided with the annular groove 22 for preventing the disengagement of the Belleville spring 20, as described above, the Belleville spring 20 can be mounted easily in the retaining groove 21. Further, after the mounting of the Belleville spring 20, a posterior treatment for preventing the disengagement of the Belleville spring 20 is not required. Therefore, the assemblability is good, and an increase in the number of processing steps can be suppressed, which can contribute to a reduction in cost.

Figure 4:
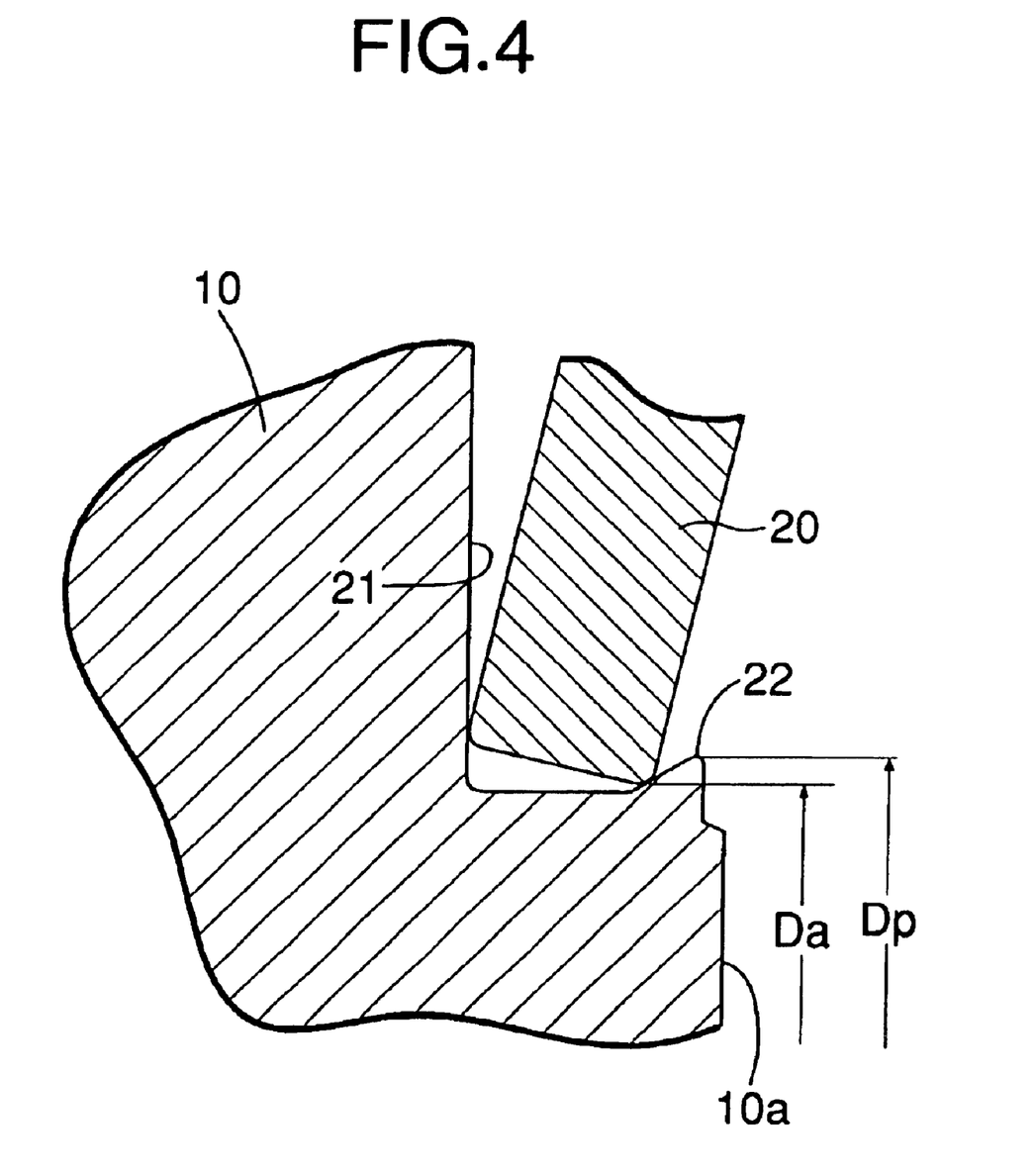
FIG. 4 is a view similar to FIG. 2, but showing another embodiment of the present invention.

FIG. 4 shows another embodiment of the present invention, which has the same arrangement as that in the previous embodiment, except that an annular projection 22 for preventing the disengagement of the Belleville spring 20 is formed by crimping at an opening edge of a retaining groove 21 in the clutch piston 10, but its function and an effect are not different from those in the previous embodiment. Therefore, portions or components corresponding to those in the previous embodiment are designated by the same reference symbols and numerals in FIG. 4, and the description of them is omitted.

Finally, yet another embodiment of the present invention shown in FIGS. 5 to 7 will be described below.

In this embodiment, a Belleville spring 20 assumes a truncated conical shape such that its diameter is decreasing from the side of the clutch piston 10 toward the first friction plates 14. The Belleville spring 20 is disposed so that its outer peripheral end is accommodated in a retaining groove 21' in a clutch piston 10, and its inner peripheral end protrudes from the pressing surface 10a of the clutch piston 10 and is opposed to the first friction plate 14 with a predetermined gap left therebetween. An annular projection 22' is formed at an axial opening edge of the retaining groove 21' to face radially outwards, so that it is opposed to an outer side of the outer peripheral end of the Belleville spring 20. The disengagement of the Belleville spring 20 from the retaining groove 21' is inhibited by the annular projection 22'.

The Belleville spring 20 is formed into an elliptic shape in a free state, as in the previous embodiment. When an outer shorter diameter of the spring 20 is represented by Da'; an outer longer diameter of the spring 20 is represented by Db', and the diameter of the annular projection 22' is represented by Dp', the following inequality is satisfied:

$$Da' < Dp' < Db'$$

and when the Belleville spring 20 is resiliently deformed into a substantially perfect circle, the outer diameter of the Belleville spring 20 becomes smaller than the diameter Dp' of the annular projection 22'.

Therefore, if the elliptic Belleville spring 20 is resiliently deformed into the substantially perfect circle, it can be inserted into the retaining groove 21' without interference to its outer peripheral end by the annular projection 22. If the Belleville spring 20 is restored into the elliptic shape after the insertion, its outer longer diameter Db' becomes larger than the diameter Dp' of the annular projection 22' so that the disengagement of the Belleville spring 20 from the retaining groove 21' can be inhibited by the annular projection 22'.

Figure 5:
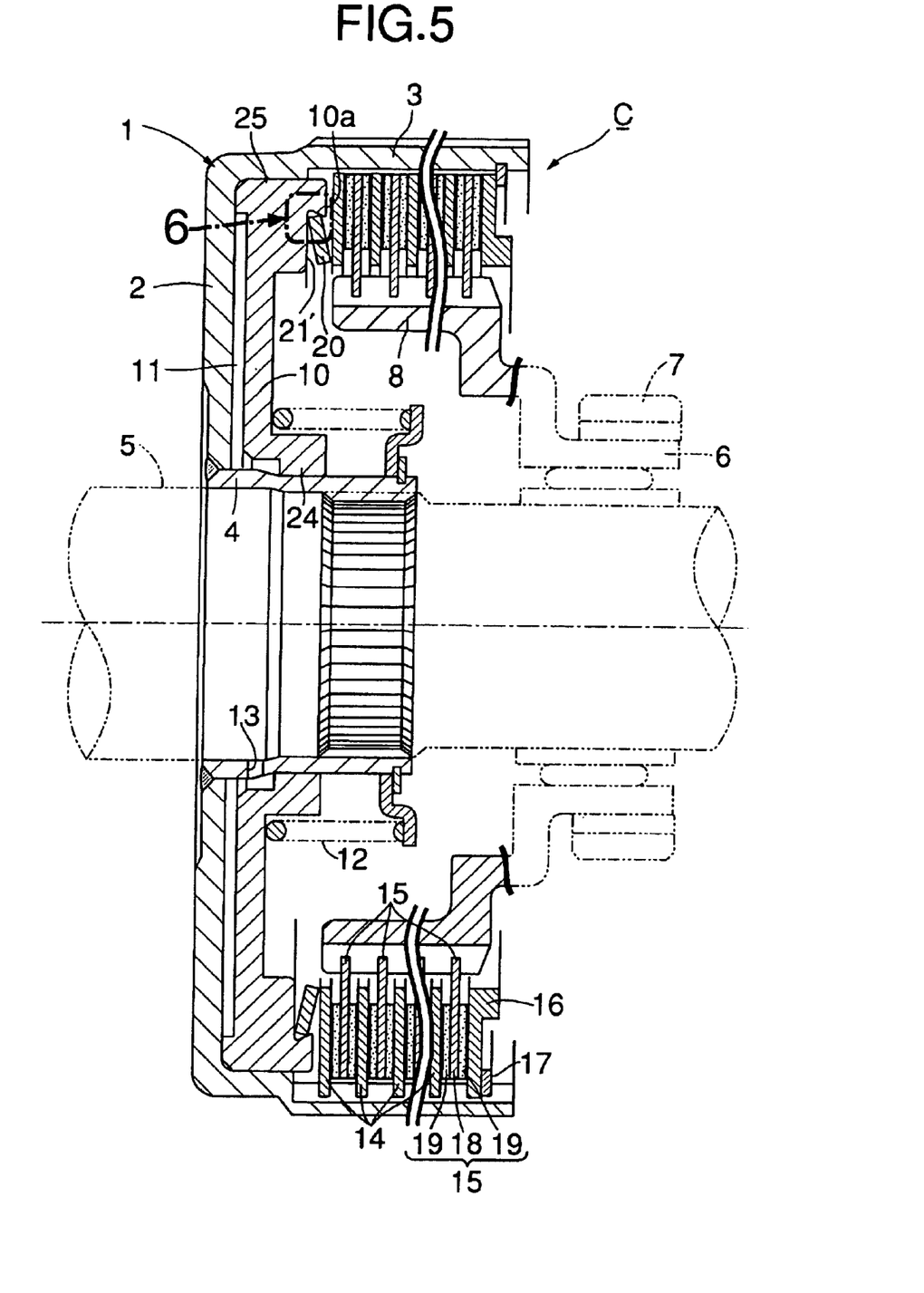
FIG. 5 is a view similar to FIG. 1, but showing yet another embodiment of the present invention.
Figure 6:
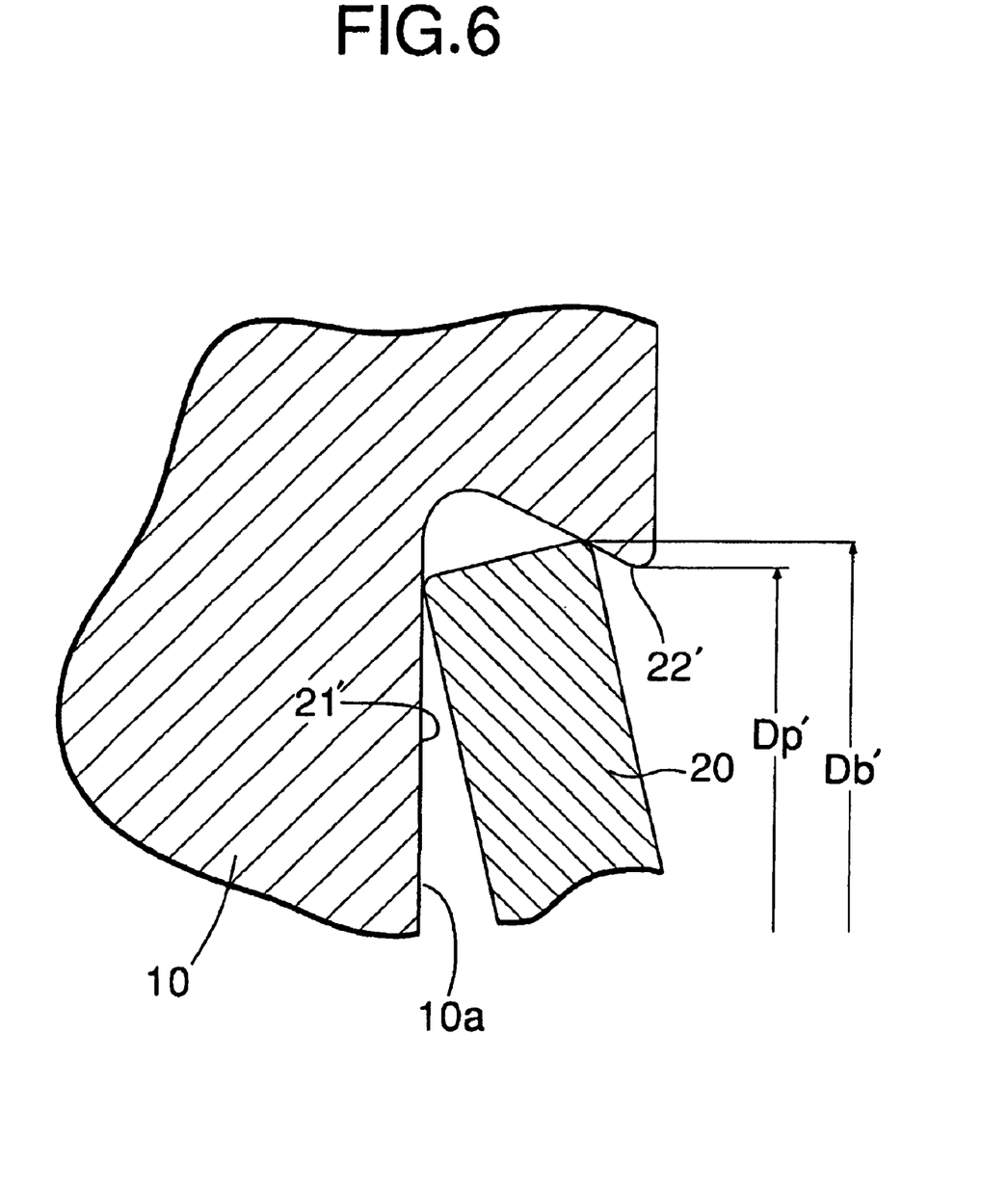
FIG. 6 is an enlarged view of a portion indicated by 6 in FIG. 5.
Figure 7:
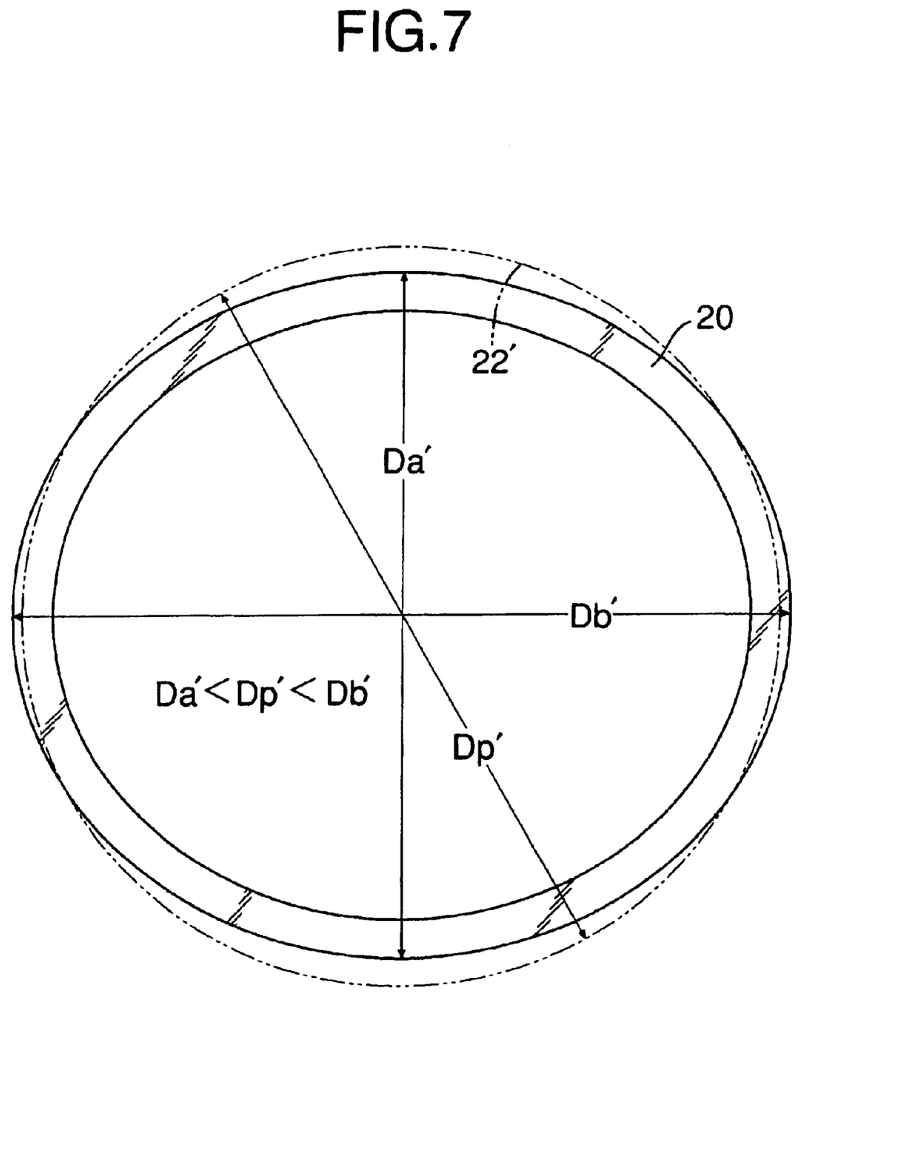
FIG. 7 is a plan view of a Belleville spring shown in FIGS. 5 and 6.

The arrangement of the other components is the same as that of the previous embodiment and hence, portions or components corresponding to those in the previous embodiment are designated by the same symbols and numerals in FIGS. 5 to 7, and the description of them is omitted.

The present invention is not limited to the above-described embodiments, and various modifications in design may be made without departing from the subject matter of the invention defined in the claims. For example, a plurality of projections may be arranged annularly in place of the annular projection 22, 22'.

What is claimed is:

1. A multi-plate friction clutch comprising: a clutch outer; a clutch inner surrounded by the clutch outer; a plurality of first friction plates which are axially slidably spline-coupled to the clutch outer; a plurality of second friction plates which are superposed alternately with the first friction plates and axially slidably spline-coupled to the clutch inner; a pressure-receiving plate fixed to the clutch outer to be opposed to one side of a group of the first and second friction plates; and a clutch piston which is fitted to the clutch outer and which is capable of being hydraulically operated to press the group of the first and second friction plates toward the pressure-receiving plate, the clutch piston having a pressing surface adapted to press the group of the first and second friction plates and an annular retaining groove formed in the pressing surface, and a buffering Belleville spring being accommodated in the retaining groove and capable of resiliently abutting against the group of the first and second friction plates, wherein the retaining groove has an annular projection formed at its axial opening edge for inhibiting the disengagement of the Belleville spring from the retaining groove.

2. A multi-plate friction clutch according to claim 1, wherein the Belleville spring is formed into an elliptic shape so that, when the Belleville spring is resiliently formed into a substantially perfect circle, it can be inserted into the retaining groove without being interfered by the annular projection.

* * * * *